Feb. 12, 1935.  A. J. HANTSCHEL ET AL  1,990,690
AUTOMATIC GEAR SHIFTING MECHANISM
Filed May 10, 1932   7 Sheets-Sheet 1

Inventors
Arthur J. Hantschel
John E. Hantschel
By Hilton Jones
Attorneys

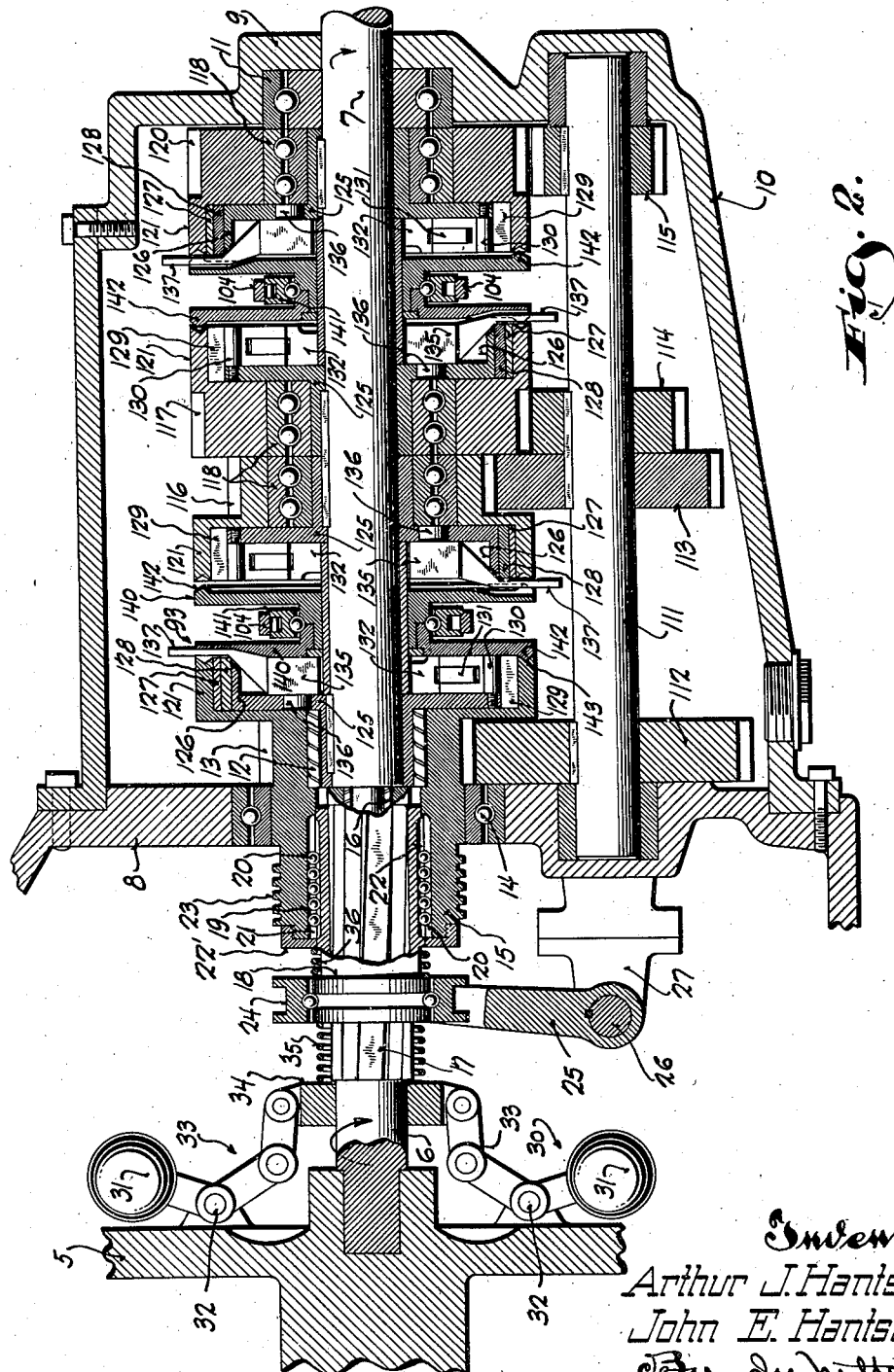

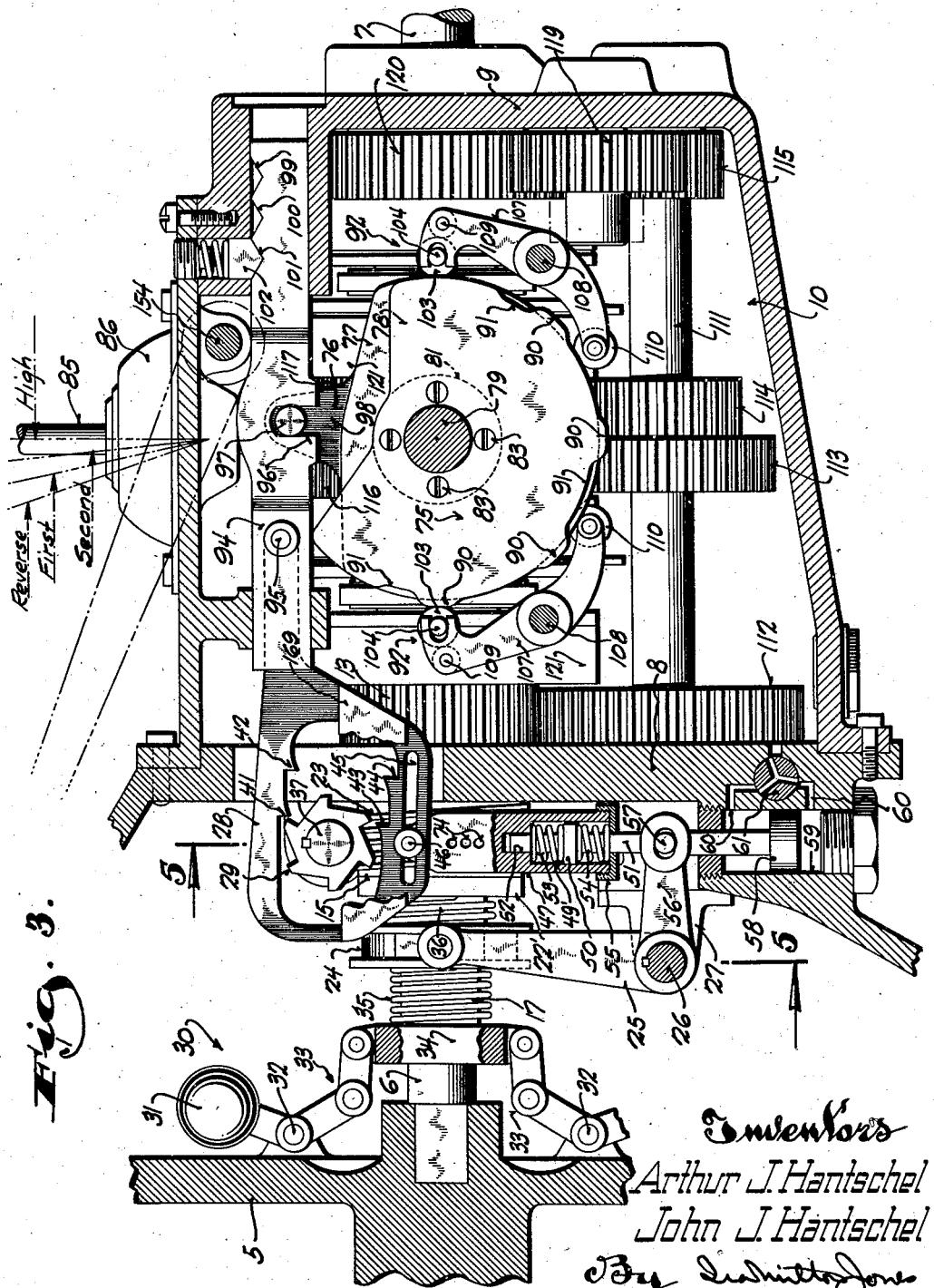

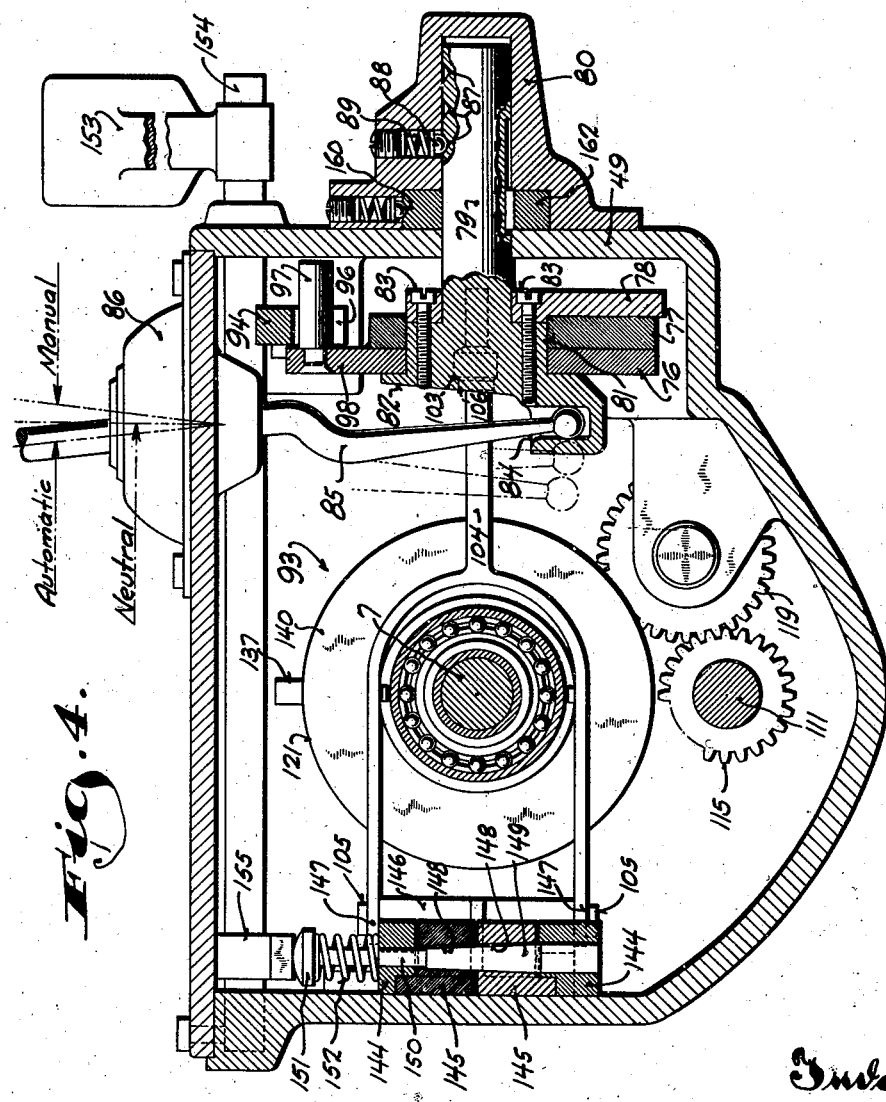

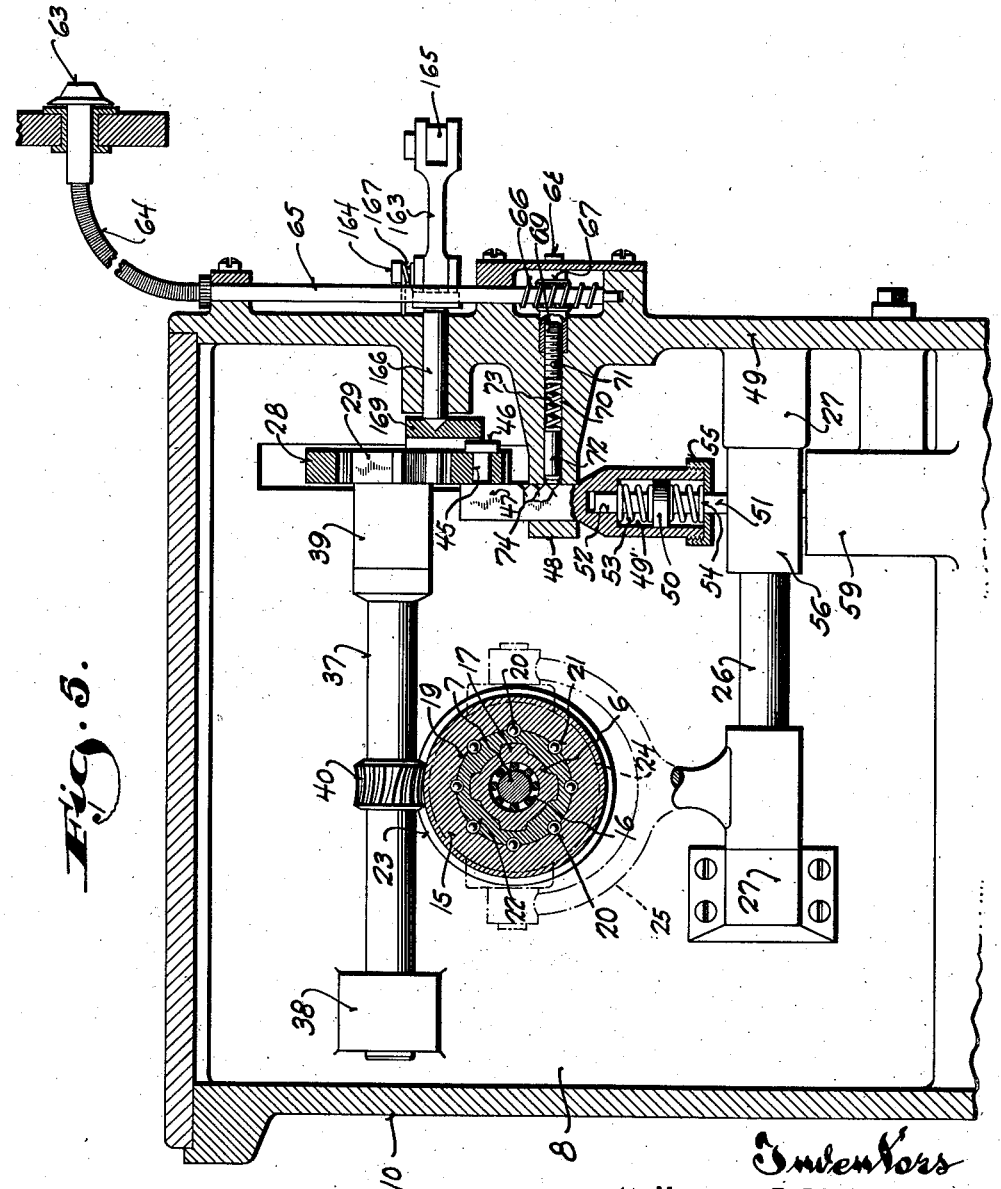

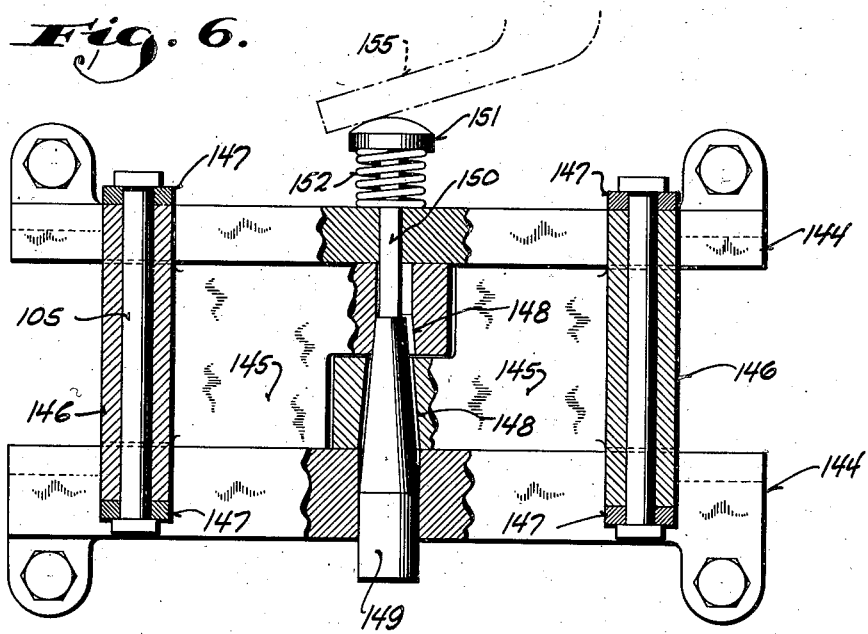
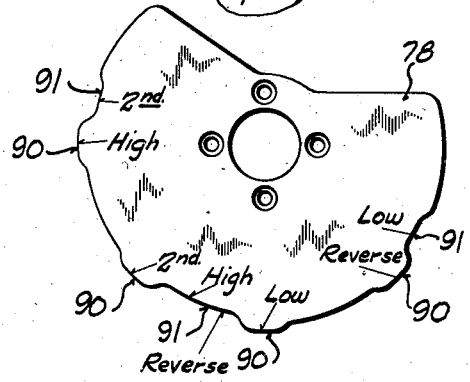
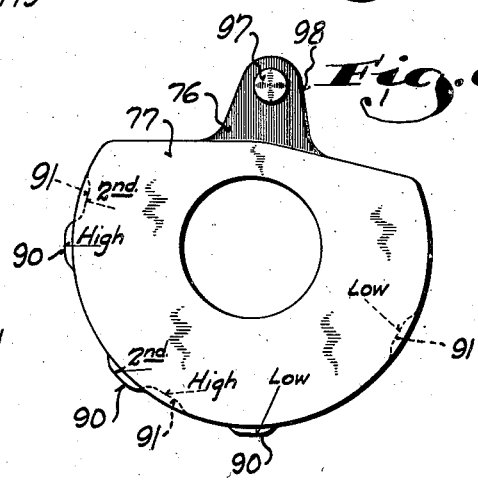
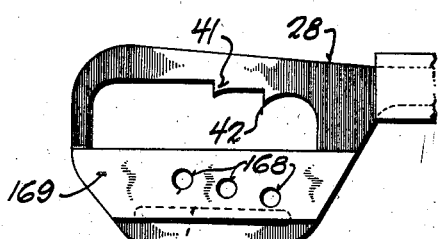

Feb. 12, 1935.  A. J. HANTSCHEL ET AL  1,990,690
AUTOMATIC GEAR SHIFTING MECHANISM
Filed May 10, 1932   7 Sheets-Sheet 7
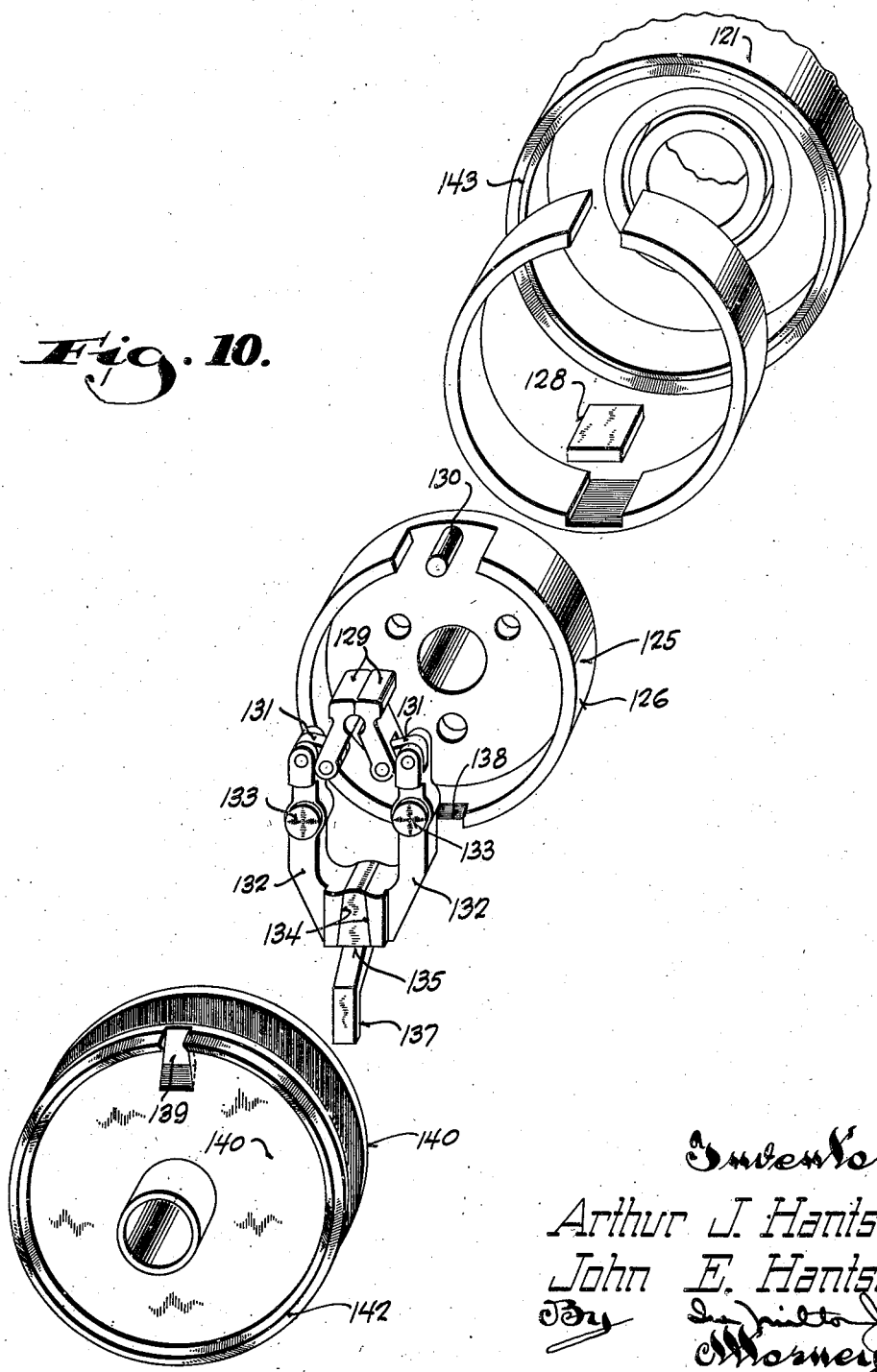

Patented Feb. 12, 1935

1,990,690

UNITED STATES PATENT OFFICE 1,990,690

AUTOMATIC GEAR SHIFTING MECHANISM

Arthur J. Hantschel and John E. Hantschel, Appleton, Wis.

Application May 10, 1932, Serial No. 610,462

16 Claims. (Cl. 74—336)

This invention relates to certain new and useful improvements in automotive vehicles and is an improvement over the automatic transmission forming the subject matter of Patent No. 1,791,593, issued February 10th, 1931.

The primary object of this invention is to provide mechanism for automatically selecting the proper gear ratio in an automotive vehicle transmission, or in other words to automatically change the driving gear ratios.

Another object of this invention is to effect the changing of the gear ratios in response to means operated by a torque differential between the driving and driven elements under the control of speed responsive means actuated directly by the driving element.

Another object of this invention is to provide means whereby the mechanism may be manually controlled when desired.

Another object of this invention resides in the provision of readily controlled means for predetermining the time with respect to load and speed conditions, at which the automatic shifting takes place.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, we have illustrated a complete example of the physical embodiment of our invention constructed according to the best modes we have so far devised for the practical application of the principles thereof, and in which:

Figure 2 is a vertical sectional view through the transmission taken on the plane of the line 2—2 of Figure 1;

Figure 3 is a vertical sectional view taken substantially on the plane of the line 3—3 of Figure 1;

Figure 4 is a cross sectional view taken through Figure 1 on the plane of the line 4—4;

Figure 5 is a cross sectional view taken through Figure 3 on the plane of the line 5—5;

Figure 6 is a detail section view taken through Figure 1 on the plane of the line 6—6;

Figure 7 is a detail view in elevation of the manually controlled clutch actuating cam;

Figure 8 is a detail view in elevation of the neutral and automatically controlled clutch actuating cams;

Figure 9 is a detail view of the dual rack member; and

Figure 10 is a perspective view of the various elements comprising one of the clutch assemblies shown disassembled and in the their proper order of assembly.

Figure 1:
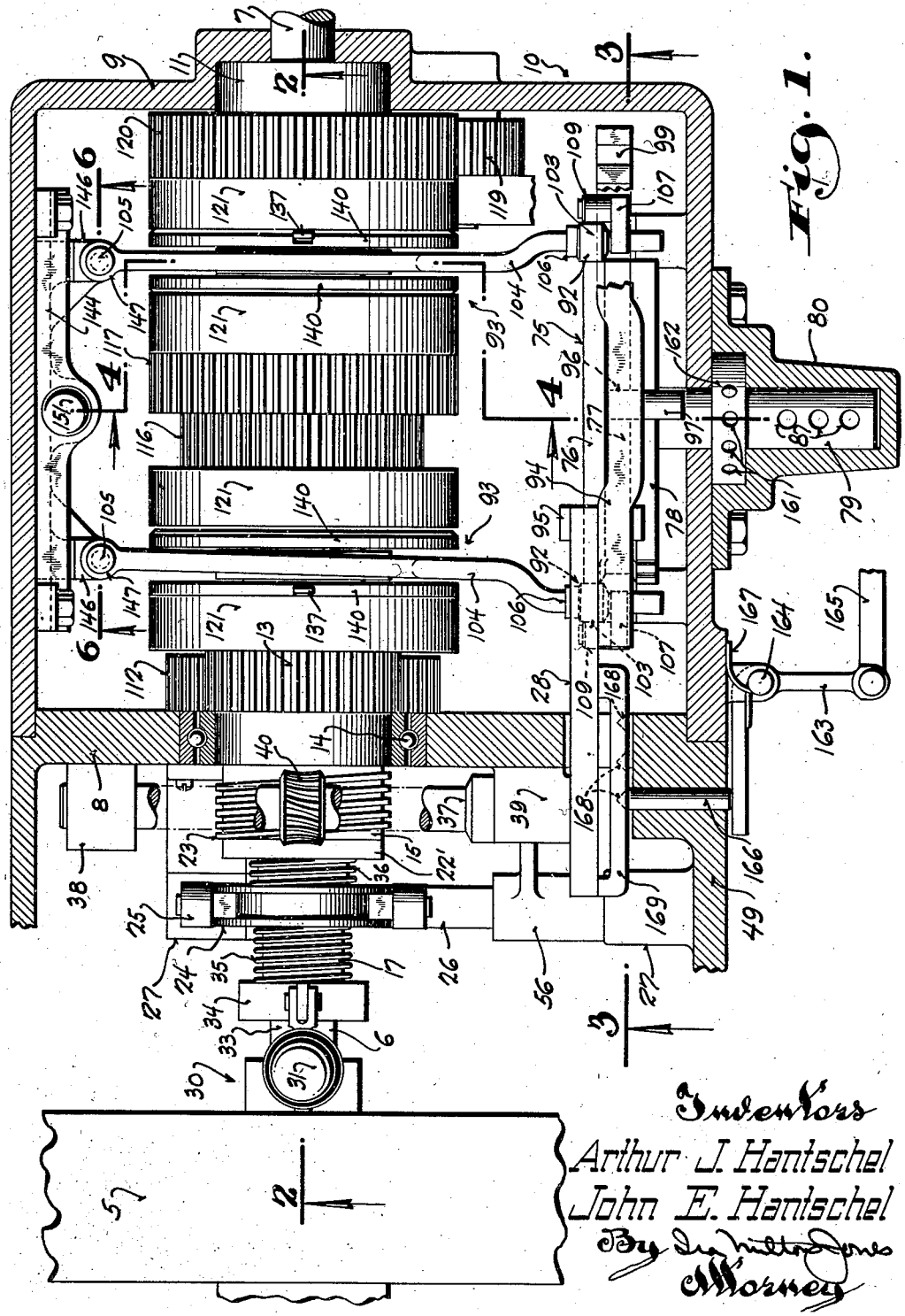
Figure 1 is a horizontal sectional view through a transmission embodying this invention.

Before describing the detailed construction of the device, it is premised that the essence of this invention resides in the utilization of torque operated means acting in direct opposition to and consequently under the control of speed responsive means to effect the selection of the various gear ratios.

The structure for obtaining this result consists briefly of a load responsive or torque actuated means between the transmission proper and the fly wheel of the engine. The particular means employed is a long spiral screw cut into the driving shaft directly adjacent the fly wheel with a sleeve threaded or splined thereon. The sleeve is non-rotatably, but slidably connected to the main or master gear of the transmission so that this gear is connected to the drive shaft through the torque responsive means. Consequently, any torque differential between the drive shaft and the driven elements, regardless of the gear ratio in operation, is applied to the torque responsive means.

As is customary, the transmission jack shaft has a gear meshing with the main master gear and has different diameter gears fixed thereto which in the present instance are in constant mesh with gears normally free on the driven shaft but adapted to be locked thereto by individual clutches.

Upon an abnormal torque differential at the torque responsive means the sliding sleeve is caused to move in one direction or the other. This motion of the sleeve along the axis of the screw is utilized to raise and lower a dual rack bar having facing sets of teeth to carry either one set or the other into the path of a constantly rotating ratchet wheel to effect longitudinal shifting of the dual rack bar in one direction or the other. Longitudinal shifting of the rack bar engages the different clutches through the medium of rotatable cams with clutch shifter forks operated by the cams.

The pitch of the screw on which the sleeve of the torque responsive means operates, is such that a torque differential caused by a heavy load, which may be considered a negative differential, tends to move the sleeve forwardly toward the fly wheel. This motion of the sleeve raises the dual rack bar against the underside of the constantly revolving ratchet wheel and effects a shift into a lower gear ratio.

However, this forward motion of the sleeve is directly opposed by the speed responsive means so that if the negative differential takes place when the vehicle is traveling at a high rate of speed, the then existing excessive force of the speed responsive means prevents motion of the sleeve by the torque responsive means. Not until the speed of the vehicle has decreased, is it possible for the torque responsive means to effect a shift into a lower gear ratio.

Hence it follows that the changing of the gear ratios, while effected by the torque responsive means, is at all times under the control of the speed responsive means.

Referring now more particularly to the accompanying drawings in which like numerals indicate like parts throughout the several views, the numeral 5 represents the fly wheel of an internal combustion engine from which the drive shaft 6 non-rotatably secured thereto projects. The drive shaft 6 is adapted to be drivingly connected with the driven shaft 7 through the selective gear ratio changing mechanism to be later described. The driven shaft is journalled in bearings carried by front and rear walls 8 and 9, respectively, of a transmission housing 10. The bearing 11 at the rear wall 9 is carried directly thereby, but the bearing 12 for the forward end of the driven shaft 7 is mounted in a main driving gear 13 journalled in the front wall 8 of the housing by a bearing 14.

The main gear 13 has a bored extension 15 projecting forwardly from the wall 8 to receive the adjacent end of the drive shaft 6. This end of the drive shaft is bored and contains a pilot bearing 16 in which the proximate end of the driven shaft is journalled. The pilot bearing 16 insures coaxiality between the shafts and affords a free running support for the drive shaft.

The major length of the drive shaft 6 has a long spiral spline or screw thread 17 cut therein on which the torque responsive sleeve 18 is slidably splined. The sleeve 18 has its rear end extended into the bore 19 of the hub extension 15 to be slidably splined thereto through the medium of a plurality of balls 20 disposed in longitudinal passages formed by cooperating semi-circular grooves 21 and 22 cut respectively into the wall of the bore 19 and the outer diameter of the sleeve 18.

The balls 20 are retained in their respective passages by a collar 22' threaded on the end of the hub extension 16. The outer diameter of the hub extension 15 has a spiral screw thread 23 cut therein for a purpose to be later described.

The forward end of the sleeve 18 has a spanner ring 24 freely rotatably but non-longitudinally movably attached thereto, through which longitudinal motion of the sleeve is imparted to a shifter fork 25 fixed to a transverse shaft 26 journalled in bearings 27 carried by the wall 8. Rocking movement of the shaft 26 in response to motion of the shifter fork following the sleeve 18 either raises or lowers the dual rack bar 28 into engagement with the continuously rotating ratchet wheel 29 to effect a shifting of the gear ratios as will be hereinafter described.

Carried by the fly wheel 5 is the speed responsive means 30 comprising two weights 31 pivotally mounted as at 32 and connected through linkage 33 with a collar 34 slidable on the smooth cylindrical forward end portion of the drive shaft. Confined between the collar 34 and the adjacent front end of the sleeve 18 is a compression spring 35 through which the effect of the speed responsive means is imparted to the sleeve in direct opposition to the force imposed on the sleeve by a torque differential between the driving and driven elements.

A spring 36 confined between the collar on the forward end of the sleeve and the collar 22' insures the engagement of the forward end of the sleeve with the spring 35 and causes it to follow the forward movement of the collar 34.

The direction of the pitch of the spiral splines 17 on the drive shaft is such that excessive load conditions on the driven shaft creating a negative differential with a tendency for the driven shaft to lag behind the drive shaft as in starting the automobile or when the same is ascending an incline, causes the sleeve 18 to move forwardly toward the fly wheel in opposition to the force of the spring 35 and the effect of the speed responsive means 30. In the event the speed of the vehicle at this time is considerable and shifting into a lower gear is undesirable, the force of the speed responsive means 30 will be sufficient to preclude forward shifting of the sleeve 18 so that the mechanism will remain in high gear as illustrated in Figures 1, 2 and 3.

As the speed of the vehicle diminishes, the power of the speed responsive means decreases and the sleeve 18 will move forwardly toward the fly wheel in response to the aforesaid torque differential between the driving and driven elements thus causing the shifter fork 25 and the transverse shaft 26 to be actuated.

The continuously rotating ratchet wheel 29 is fixed to a shaft 37 journalled in bearings 38 and 39 carried by the wall 8. The shaft 37 has a spiral gear 40 fixed thereto which meshes with the thread 23 on the hub 15 so that the drive for the ratchet wheel is obtained from the continuously turning main gear 13.

The dual rack 28, as best illustrated in Figures 5 and 9, is substantially a rectangular frame having ratchet teeth 41 and 42 on the inner edge of its top bar and teeth 43 and 44 on the inner edge of its bottom bar. The bottom bar also has an elongated slot 45 in which a pin 46 is slidably received.

The pin 46 is carried by a plunger 47 slidable in a bearing 48 carried by the adjacent side wall 49 of the transmission housing. The lower end of the plunger 47 is bored as at 49' to freely slidably receive a collar 50 fixed to a vertical shaft 51 projected into the bore of the plunger and slidably mounted at its extreme upper end in a pilot bearing 52.

At opposite sides of the collar 50 are compression springs 53 and 54. The spring 53 is confined between the bottom of the bore 49' and the collar 50, and the spring 54 is confined between the collar 50 and a cap 55 closing the open end of the plunger bore.

The shaft 51 is thus yieldingly connected to the plunger 47 so that upon vertical motion of the shaft 51 effected by rocking movement of the transverse shaft 26 in response to movement of the torque sleeve 18, which motion is imparted to the shaft 51 through a lever 56 secured to the shaft 26 and connected to the shaft 51 as at 57, the dual rack bar 28 will be raised or lowered. In the event of improper meshing between the teeth of the ratchet wheel and the rack bar, i. e. in the event the teeth engage at their points, either one or the other of the springs 53 and 54, depending upon the direction of movement of the shaft 51, will yield to avoid injury to the parts and effect the proper engagement after the ratchet wheel has turned slightly.

The extreme lower end of the shaft 51 carries a piston 58 slidable in a cylinder 59 formed in the transmission wall and supplied with a fluid lubricant from the interior of the transmission housing through passages 60 controlled by a valve 61. The opposite ends of the cylinder 59 at opposite sides of the piston 58 are communicated through the valved passages so that a dash pot effect is obtained to retard the up and down movement of the shaft 51, and as the dash pot effect is controllable by the valve 61 it follows that through adjustment of the valve the degree of force required for shifting the shaft 51 may be regulated so that the time at which the shifting of the gears takes place with respect to the speed and load conditions may be set.

The degree of force necessary to effect shifting of the plunger 47 and consequently the dual rack to and from its various positions is also manually controllable from the dash of the vehicle. For this purpose an operating member 63 is provided. The operating member is connected through a flexible shaft 64 with a shaft 65 journalled in suitable bearings on the side wall of the transmission housing. At its lower end the shaft 65 has a screw thread 66 meshing with a spiral gear 67 secured to a shaft 68. The shaft 68 is mounted for free rotation and has a threaded connection at its inner end with a screw 69 slidable in a bore 70 formed in the wall 49 and held against turning therein by a cross pin 71 operating in grooves formed in the opposite walls of the bore 70.

At the extreme inner end of the bore 70 a pin 72 is slidably mounted, and confined between the pin 72 and the end of the screw 69 is a spring 73 to yieldably urge the pin 72 outwardly of the bore 70 and into engagement with one of a plurality of notches 74 in the adjacent face of the plunger 47. This yieldable engagement of the pin 72 in the notches 74 tends to restrain or delay action of the plunger 47, and as will be readily apparent this retarding effect is readily controlled by the actuation of the operating member 63.

The longitudinal shifting of the dual rack 28 effected by the driving action of the ratchet wheel 29 oscillates a cam assembly indicated generally by the numeral 75. The cam assembly 75 consists of three plates 76, 77, and 78 carried by a shaft 79 rotatable and slidable in a bearing 80 fixed to the side wall 49 of the transmission housing. At its inner end the shaft 79 has a circular enlargement 81 on which the plates 76 and 77 which are welded together as one unitary structure are journalled, being confined between the plate 78 and an enlarged head 82 on the extreme inner end of the shaft 79. The plate 78 is secured to the enlargement 81 of the shaft by screws 83.

The enlarged head 82 has a pocket 84 formed on its inner face into which the lower end of a shifter rod 85 projects, the shifter rod being swivelly mounted as at 86 and projecting above the floor of the automobile in the conventional manner for manual actuation. Through the shifter rod 85, the cam assembly may be moved sidewise sliding the shaft 79 axially along its bearing 80 to set the cam assembly for manual or automatic operation or in a neutral position. To define these three positions of the cam assembly the shaft 79 has three detents 87 with which a detent member 88 pressed inwardly by a spring 89 cooperates.

The cam plates 76 and 78 which are the automatically and manually operable cams respectively, have a plurality of raised projections 90, and depressions 91 formed about their peripheries with which cam followers indicated generally by the numeral 92 cooperate to effect engagement and disengagement of the clutches indicated generally by the numeral 93, to determine the effective ratio of the gear connection between the driving and driven shafts as will be hereinafter more fully described.

The cam 77 is the neutral cam. This cam is of uniform diameter and has no raised projections or depressions so that when the cam followers ride thereon all of the clutches will remain in their neutral inactive positions regardless of rotation of the cam assembly.

The three positions of the shifter rod 85 to locate the cam assembly in neutral, manual or automatic positions as defined by the three detents 87, are diagrammatically illustrated in construction lines in Figure 4.

The drawings illustrate the cam assembly in position with the automatic cam plate 76 operative.

Consequently, turning movement of the cam 76 produced by the motion of the dual rack 28 as will be described, renders the clutches 93 effective as required by the operating conditions of the vehicle.

The dual rack bar 28 is connected with the automatic cam plate 76 through a bar 94 constrained for longitudinal motion and pivotally connected to the rack bar as at 95. At an intermediate point the bar 94 has a vertical slot 96 to receive a pin 97 fixed to an extension 98 formed on the cam plate 76. Through this connection any longitudinal shifting of the rack bar effected in the manner hereinbefore described imparts turning movement to the automatic cam plate 76. It is observed that the pin 97 is of sufficient length to maintain engagement with the slot 96 at all times even though the cam assembly be shifted to its position of manual operation.

To definitely locate the three positions to which the cam plate 76 is turned by the longitudinal shifting of the bar 94, three detents 99, 100, and 101 are formed in the bar corresponding respectively to "first", "second" and "high" gear, with which a spring urged plunger 102 engages.

The cam followers indicated generally by the numeral 92 comprise rollers 103 mounted on the outer ends of shifter fork arms 104 pivotally mounted at their bifurcated ends as at 105. The rollers 103 are held in position on the outer ends of the shifter fork arms by collars 106 fixed to the arms and levers 107 medially pivoted on studs 108 carried by the adjacent wall of the housing. The upper ends of the pivoted levers 107 are bifurcated to receive the proximate ends of the fork arms and carry small rollers 109 which ride on the rollers 103. The lower ends of the levers 107 have rollers 110 mounted thereon, which like the rollers 103 are arranged to track on the periphery of any one of the three cam plates.

The arrangement of the projections 90 and the depressions 91 on the cam peripheries is such that when a roller 103 engages a high spot or projection the corresponding roller 110 is in a depression and vice versa. Through this arrangement the rollers 103 and consequently the free ends of the fork arms are caused to positively follow the depressions of the cams so that the shifter forks are positively actuated in both directions from a neutral central position to positively effect engagement of either one of the two clutches which each fork arm controls.

Before taking up the specific construction of the clutches 93, the arrangement of the gears on the driven shaft and the jack shaft 111 will be defined.

As hereinbefore noted the main master gear which is journalled in bearing 14 carried by the wall 8 is drivingly connected with the drive shaft through the torque responsive sleeve 18. This main master gear 13 is in constant mesh with a gear 112 fixed to the jack shaft 111. Also fixed to the jack shaft 111 are gears 113, 114, and 115, each successively smaller in diameter.

The gears 113 and 114 mesh respectively with gears 116 and 117 loosely journalled by bearings 118 on the driven shaft. The gear 115 is in constant mesh with an idler 119 which in turn meshes with a gear 120 similar to the gear 117 and likewise journalled by a bearing 118 on the driven shaft 7. Through the gears 115, 119 and 120, reverse is obtained.

Each of the gears 13, 116, 117 and 120 have integral annular flanges 121 within which the clutch assemblies now about to be described, are disposed.

Each clutch assembly comprises a flanged disc 125 keyed to the driven shaft and disposed within its respective flange 121 with its peripheral flange 126 spaced from the flange 121. Surrounding the flange 126 is a split brake band 127. The brake band is keyed to the flange 126 opposite its split by a key 128.

In its normal position, the brake band 127 is contracted out of frictional contact with the inner wall of the flange 121 and means are provided for expanding the band into frictional engagement therewith to afford a driving connection between the flange 121 and the disk 125.

It is remembered that the flanges 121 are integrally connected with their respective gears 13, 116, 117 and 120 so that a driving engagement between any one flange 121 and its disc 125 effects a driving connection between the associated gear and the driven shaft.

To spread the brake bands 127 into frictional engagement with their flanges 121, each clutch has a pair of expanding shoes 129 pivotally mounted on opposite sides of a stud 130 carried by the disc 125. Through links 131 the expanding shoes are connected to levers 132 medially pivoted on studs 133 also fixed to the disc 125. The ends of the levers 132 opposite their connections with the links 131 are provided with complementary flat surfaces 134 between which an expanding lever 135 is positioned. The lever 135 has a stud 136 to pivotally mount the same on the disc 125 and the outer end 137 of the lever projects through a notch 138 in the flange 126 to engage in a notch 139 cut into a disc 140 which is freely rotatably mounted on the driven shaft and is disposed over the open front of the flange 121.

The discs 140 are arranged in pairs rigidly connected and spaced apart to receive the bifurcated ends of the shifter forks 104. A spanner ring 141 encircling the hubs of the discs 140 and freely rotatably but non-longitudinally movably mounted thereon provides means for connecting the assembled discs 140 with the shifter forks 104 so that upon actuation of the forks by the cams as hereinbefore described, the assembled discs 140 will be shifted one way or the other.

It is observed that the discs 140 carry at their peripheral edge portions pointed rims 142 which are adapted to engage in correspondingly shaped grooves 143 in the peripheral edges of the flanges 121. Consequently upon shifting of a disc 140 toward the proximate flange 121, the frictional engagement between the rim 142 and the groove 143 causes the disc to revolve with the flange 121 so engaged.

This tendency on the part of the disc 140 to follow the flange 121 causes the free end of the lever 137 through its engagement with the notch 139 in the disc 140 to pivot about its anchor pin 136 and spread the adjacent ends of the levers 132. The motion of the levers 132 is imparted to the expanding shoes 129 which in turn spread the split brake band 127 into frictional engagement with the flange 121 and thus establish a secure driving engagement between the flange 121 and the disc 125.

Upon the establishing of this driving connection, the entire clutch assembly including the discs 140 shifted to initiate the engagement, revolve with the shaft and the gear connected with the particular flange 121.

Inasmuch as all of the gears 13, 116, 117 and 120 are at all times in mesh with the continuously rotating gears secured to the jack shaft 111 it follows that by locking any one of the gears 13, 116, 117 or 120 to the driven shaft, a driving connection including the particular gear locked to the shaft is established between the driving shaft and the driven shaft. If the flange 121 which is connected to the gear 13 is locked to the driven shaft 7, a direct drive will be established between the driving and driven shafts or the transmission will be said to be in "high".

If the next adjacent flange 121 or that flange associated with the gear 116 is locked to the driven shaft, the connection between the driving and driven shafts will be through the gears 113 and 116 and the transmission will be said to be in "second".

Similarly, locking the flange of the gear 117 to the driven shaft causes the drive between the driving shaft and driven shaft to be established through the gears 114 and 117 which corresponds to "low".

The gear 120 as hereinbefore noted is employed to obtain reverse, so that upon locking its flange 121 to the driven shaft, gear 115 and the idler gear 119 will provide the driving connection between the driving and driven shafts and transmission will be said to be in "reverse".

Inasmuch as the shifting of the assembled discs 140 which initiates the engagement of the clutches is effected by swinging the fork arms 104 in one direction or the other on their respective pivotal mountings 105, it is possible to render the entire control for the clutches inoperative by freeing the pivoted ends 105. Upon so freeing the pivoted ends of the fork arms 104, the control for the clutches, either manual or automatic, is not only rendered ineffective, but in the event any clutch is engaged and it is desired to effect disengagement thereof, this may be accomplished without shifting the gear ratio, as now about to be described.

The pivotal mounting 105 for the shifter fork arms 104 is best illustrated in Figure 6 and comprises opposed tracks 144 secured to the adjacent side wall of the transmission housing. Slidably mounted between these tracks are two blocks 145. The outer ends of the blocks 145 have bored lugs 146 projecting therefrom in which the pivot pins 105 are mounted. The ends of the pivot pins pass through the bifurcated end portions 147 on the adjacent ends of the shifter fork arms so that the arms are pivotally connected to the blocks 145. The inner ends of the blocks 145 overlap as illustrated in Figure 6 and are provided with tapered bores 148 in which a tapered pin 149 is received.

The opposite ends of the pin 149 are normal to the axis of the pin and are received in bores of corresponding diameter in the tracks 144. The upper small diameter end 150 of the pin 149 projects beyond the upper track 144 and has a head 151 secured thereto. Confined between the head 151 and the adjacent top surface of the track 144 is an expansion spring 152 which normally yieldably urges the pin 149 to its uppermost position firmly seated in the tapered bores 148 to lock the blocks 145 in a definite fixed position.

With the blocks 145 locked to the tracks in this manner the axes of the pins 105 are fixed, and firm pivotal supports are provided for the shifter fork arms 104. However, upon depression of the pin 149, the blocks 145 are released from their positively held positions allowing the pivotal supports for the shifter fork arms 104 to float. Under this condition it is impossible to utilize the shifter fork arms to shift the discs 140 through which the initial engagement of the clutches is effected. Also, in the event any clutch is engaged the release of the blocks 145 in this manner disengages said clutch.

A clutch pedal 153 mounted for manual actuation in the usual manner is provided for depressing the pin 149 and rendering the clutches ineffective. The pedal 153 is secured to a transverse shaft 154 to which an arm 155 is attached, the free end of which overlies the head 151 of the pin as clearly illustrated in Figure 6.

*Automatic operation*

The description thus far defines the structure entering into the automatic operation of the device, and to coordinate the various elements the automatic functioning of the transmission will now be described.

The drawings illustrate the transmission in "high" gear and for this condition to prevail it must be assumed that the vehicle is operating at normal running speeds. The positions of the various parts may be briefly summed up as follows.

The torque responsive sleeve 18 is in its rearmost position having been so located through the coordinated effort of a positive torque differential between the drive and driven shafts and the speed responsive means 33. Inasmuch as the torque responsive sleeve 18 is in its rearmost position the plunger 47 and consequently the dual rack bar 28 are in their lowermost positions with the tooth 41 of the upper bar of the dual rack nearest the periphery of the continuously rotating ratchet teeth, but moved beyond the reach of the teeth, being held therefrom by the engagement of the spring plunger 102 in the detent 101.

The bar 94 is held by the aforesaid action of the plunger 102 and the detent 101 in its position corresponding to "high". The automatic cam disc 76 has been shifted by the bar 94 to a position at which it has moved the outer free end of the forward shifter fork arm 104 forwardly to engage the clutch mechanism of the main gear 13. The drive from the drive shaft to the driven shaft is thus through the gear 13 which as hereinbefore noted is non-rotatably connected with the drive shaft, directly to the driven shaft through its respective clutch.

When abnormal load conditions are encountered such as would be produced by the ascension of an incline, the speed of the vehicle will diminish and the torque differential will change from positive to negative in response to these altered conditions, sliding the sleeve 18 forwardly and raising the dual rack 28 to bring its tooth 43 on its bottom bar into the path of the teeth of the continuously revolving ratchet wheel.

Upon engagement of the tooth 43 with one of the teeth of the ratchet wheel the rack moves forwardly, to the left with respect to Figure 3, a distance sufficient to bring the detent notch 100 into alignment with the spring pressed plunger 102. During this longitudinal shifting of the bar 94 by the rack the automatic cam plate 76 is turned one step so that the roller 103 of the then active shifter fork arm 104, which is the forward arm, moves into a depression 91 on the cam plate 76 and its associated roller 110 moves onto a raised projection 90. This causes the said forward shifter fork arm to swing to its rearmost position disengaging the clutch of the gear 13 and engaging the clutch of the gear 116 so that the gear ratio between the driving and driven shaft is in "second" speed.

During this turning movement of the cam 76 the rear shifter fork arm remains stationary as its rollers 103 and 110 ride on the normal diameter of the cam.

In the event the load conditions require still a lower gear ratio the torque differential as permitted by the speed responsive means shifts the sleeve 18 further toward the fly wheel and raises the plunger 47 and the rack bar 28 another step. The tooth 44 on the rack bar is then engaged by the ratchet wheel and the bar 94 is pulled forwardly to its next step at which the spring plunger 102 engages the detent notch 99.

During the turning movement of the cam 76 produced by this forward motion of the bar 94, the forward shifter fork arm is moved to its neutral inactive position and the rear shifter fork arm is actuated to engage the clutch of the gear 117. This motion on the part of the rear shifter fork arm is effected by its roller 103 entering a depression 91 and its roller 110 riding onto a projection 90. The transmission is now in "low" gear where it will remain until the load conditions are relieved or the vehicle stopped by disengaging the engaged clutch.

The cycle of operation to shift from "low" gear to "high" gear automatically is directly opposite to that just described.

Reverse is not obtained automatically.

*Manual control*

In the event it is desired to dispense with the automatic control feature, the different clutches through which the effective gear ratios are selected may be actuated by manual actuation of the shifter rod 85. This rod as best illustrated in Figure 4 through the engagement of its inner end in the pocket 84 provides for the sidewise shifting of the cam assembly to dispose any one of the three cam plates in line with the cam following rollers 103 and 110.

Assuming that the cam assembly has been shifted to render the manual cam 78 operative it will be seen that forward and backward movement of the rod 85 in a straight line turns the manual cam plate 78 to move the shifter fork arms back and forth to effect the engagement of the selected clutches. Inasmuch as the reverse position is added to the three forward speeds in the manual control, the manual cam plate 78 has four definite positions which are located or defined by the engagement of a ball member 160 in detent notches 161 formed in the periphery of a collar 162 keyed to the shaft 79. The ball member 160 is carried by the bearing structure 80 and is yieldably urged toward the collar 162 by a compression spring.

Inasmuch as the action of the shifter fork arms 104 by the turning movement of the cam plate 78 is the same as that obtained through the automatic cam plate 76 as hereinbefore described, it will be unnecessary to describe in detail the manner in which the various speed ratios are obtained manually. Reverse is obtained by moving the shifter lever to its extreme forward position as indicated graphically by construction lines in Figure 3.

To insure a smooth change-over from one speed ratio to another, means are provided to momentarily close the throttle of the engine during the actual shifting cycle. For this purpose a bell crank lever 163 is pivoted as at 164 on the outside of the transmission housing. One arm of the bell crank lever is connected through a link 165 to the throttle control (not shown) and the other arm thereof engages the outer end of a pin 166 slidably mounted in a hole through the side of the transmission housing. A spring 167 yieldably maintains the bell crank lever 163 in its position tending to push the pin 166 inwardly. The inner end of the pin 166 is pointed and is arranged to engage in one of three recesses 168 formed in a plate 169 carried by the dual rack as best shown in Figure 9.

When the inner end of the pin 166 is engaged in any one of the recesses 168 the throttle is undisturbed, but as the rack is moved from one position to the other and the pin 166 is pushed outwardly, the throttle is momentarily closed.

From the foregoing description taken in connection with the accompanying drawings, it will be readily apparent to those skilled in the art to which an invention of this character appertains, that this invention affords novel means for automatically selecting the proper gear ratios in response to the operating conditions of an automotive vehicle and that proper selection is assured by the fact that the torque responsive means which effects the selection of the ratios is at all times under the control of speed responsive means.

Having thus described our invention, what we claim as new is:

1. In a device of the character described, driving and driven shafts, variable gear ratio changing mechanism between the driving and driven shafts, yieldable means operable by the torque of said driving and driven shafts for automatically selecting the gear ratio between said shafts, and speed responsive means operable by the speed of the driving shaft and acting on said yieldable means in direct opposition to said driving torque.

2. In a device of the character described, driving and driven shafts, variable gear ratio changing mechanism between the driving and driven shafts, load responsive means operable by the driving torque of said driving shaft for automatically determining the gear ratio between said shafts, and speed responsive means operable by the speed of the driving shaft and exerting a force on said load responsive means in direct opposition to the torsional force of the driving shaft.

3. In a device of the character described, a driving shaft, a driven shaft, variable gear ratio changing mechanism between the driving and driven shafts, torque responsive means operable to automatically effectuate a selection of the gear ratio between the driving and driven shafts, and speed responsive means actuated directly by the driving shaft and operating at all times in direct opposition to the torque responsive means to control the functioning of said torque responsive means.

4. In a device of the character described, a driving shaft, a driven shaft, a plurality of sets of gears to drivingly connect said shafts, said sets of gears having different gear ratios, means to render one of said sets of gears operative at a time, a member movable to effect the actuation of said means, torque responsive means to move said member, and speed responsive means actuated directly by the driving shaft and operable to apply a force at all times directly on said member in opposition to that of the torque responsive means.

5. In a device of the character described, a driving shaft, a driven shaft, variable gear ratio changing mechanism between the driving and driven shafts, torque responsive means including a member movable axially along the driving shaft, means operable by the movement of said member for effecting a selection of the gear ratio between the driving and driven shafts, and speed responsive means including a member movable axially along the driving shaft and adapted to apply force on said other member in direct opposition to the force imparted by the torque responsive means.

6. In a device of the character described, a driving shaft, a driven shaft, selectable transmission gears for drivingly connecting said shafts, means to select the transmission gears to drivingly connect the shafts, a member movable in a fixed path to actuate said means, torque responsive means to actuate said member along said fixed path, and speed responsive means carried by the driving shaft and having a part movable along said fixed path to apply force to said member in opposition to that imparted thereto by the torque responsive means.

7. In a device of the character described, a driving shaft, a driven shaft, selectable transmission gears for drivingly connecting said shafts, means to select the transmission gears to drivingly connect the shafts, a member movable in a fixed path to actuate said means, torque responsive means to actuate said member along said fixed path, speed responsive means carried by the driving shaft and having a part movable along said fixed path to apply force to said member in opposition to that imparted thereto by the torque responsive means, and a spring between said part of the speed responsive means and the movable member to effect a predetermined balance of forces.

8. In a device of the character described, a drive shaft having a fly wheel thereon, a driven shaft, variable gear ratio changing mechanism between the driving and driven shafts, means to effect a selection of the driving gear ratio between the shafts, a member movable axially along the driving shaft adjacent the fly wheel and operable to actuate said means, torque responsive means to actuate said member along the axis of the driving shaft, and speed responsive means carried by the fly wheel and having a part movable axially along said driving shaft and adapted to impose a force on said member in opposition to the force applied thereto by the torque responsive means.

9. In a device of the character described, a driving shaft, a driven shaft, variable gear ratio mechanism to drivingly connect said shafts, a member movable to select the driving gear ratio between the shafts, and means to actuate said member automatically comprising, a rack bar connected with said member, a continuously rotating ratchet wheel, torque responsive means operable by a torque differential between the driving and driven shafts to effect a driving engagement between said ratchet wheel and rack member to move the rack member and consequently the member connected therewith, and speed responsive means to control the functioning of the torque responsive means.

10. In a device of the character described, the combination with a driving element and a driven element and variable gear ratio mechanism to drivingly connect said elements including clutch elements to be engaged and disengaged, of cam means to effect selective engagement of the clutch elements, and means to move said cam means in accordance with varying load and speed conditions at the driving and driven elements comprising torque responsive means operable to produce motion in one direction, speed responsive means to produce motion in an opposite direction, a member moved by the conjoint action of the torque responsive and speed responsive means, and means to translate the motion of said member into the required movement of said cam.

11. In a device of the character described, the combination with driving and driven elements and variable gear ratio mechanism between said elements, of means to select the effective gear ratio comprising clutch elements to be engaged and disengaged, means operable to engage and disengage the clutch elements, cam followers carried by said last named means, a manually operable cam, an automatically operable cam, means mounting said cams to be selectively cooperable with either of the cam followers whereby said clutch elements are manually and automatically operable, means to actuate the manually operable cam, and means responsive to varying load and speed conditions of the driving and driven elements to actuate the automatically operable cam.

12. In a device of the character described, a driving element, a driven element, variable gear ratio mechanism for drivingly connecting said elements, and means to automatically select the gear ratio in accordance with existing load and speed conditions at the driving and driven elements including a continuously rotating power element, a movable member selectively engageable with opposite sides of said power element to be actuated thereby in either of two directions, means operable by movement of said movable member to effect a selection of the gear ratio of said mechanism, torque responsive means operable by a torque differential between said driving and driven elements to shift the movable member into engagement with the power element, and speed responsive means operable by the speed of the driving element and acting in direct opposition to the torque responsive means to control the functioning thereof.

13. In a device of the character described, a driving element, a driven element, variable gear ratio mechanism for drivingly connecting said elements, and means to select the gear ratio in accordance with varying load and speed conditions at said driving and driven elements comprising a continuously rotating ratchet wheel, a dual rack member having two sets of opposing teeth mounted for movement to engage either of its sets of teeth with the ratchet wheel and be moved thereby, means operable by movement of the dual rack to effect a selection of the gear ratio, torque responsive means operable by a torque differential between the driving and driven elements for actuating the dual rack to engage the same with the ratchet wheel, and speed responsive means operable by the speed of the driving element and acting in direct opposition to the torque responsive means to control the functioning thereof.

14. In a device of the character described, a driving element, a driven element, variable gear ratio changing mechanism for drivingly connecting said elements, torque responsive means operable to automatically effectuate selection of the gear ratio between the driving and driven elements, speed responsive means actuated by the driving element and operating in direct opposition to the torque responsive means to control the functioning of the torque responsive means, and adjustable means to determine the time of functioning of said torque responsive means.

15. In a device of the character described, a driving shaft, a driven shaft, variable gear ratio mechanism to connect said shafts, means to select the gear ratio to drivingly connect the shafts, including a movable rack, torque responsive means operable by a torque differential between the driving and driven shafts, speed responsive means operable by the speed of the driving shaft and acting in direct opposition to the torque responsive means, a continuously rotating ratchet wheel to move the rack and effect selection of the gear ratio, and means actuated by the torque responsive means under control of the speed responsive means to effect a driving connection between said ratchet wheel and rack.

16. In a device of the character described, a driving shaft, a driven shaft, variable gear ratio mechanism to connect the shafts, a member movable to select the driving gear ratio connecting the shafts, torque responsive means operable by a torque differential between the driving and driven shafts, a continuously rotating ratchet wheel, a dual rack bar connected with said movable member and having spaced opposite rows of rack teeth at diametrically opposite sides of the ratchet wheel, means operable by the torque responsive means to effect relative movement between the rack bar and ratchet wheel and establish a driving engagement between said ratchet wheel and one or the other rows of rack teeth, and speed responsive means to control the functioning of the torque responsive means.

ARTHUR J. HANTSCHEL.
JOHN E. HANTSCHEL.